United States Patent [19]

McCullough, Jr. et al.

[11] Patent Number: 4,857,394

[45] Date of Patent: Aug. 15, 1989

[54] FLAME RETARDANT FOAMS

[75] Inventors: Francis P. McCullough, Jr., Lake Jackson; R. Vernon Snelgrove, Damon, both of Tex.; Bhuvenesh C. Goswami, Clemson, S.C.

[73] Assignee: The Dow Chemical Company, Midland, Mich.

[21] Appl. No.: 149,748

[22] Filed: Jan. 29, 1988

[51] Int. Cl.$^4$ .............................................. B32B 5/06
[52] U.S. Cl. ..................................... 428/303; 428/221; 428/284; 428/297; 428/304.4; 428/316.6; 428/408; 428/920; 521/53; 521/55
[58] Field of Search ............... 428/408, 284, 297, 920, 428/304.4, 221, 316.6, 303; 521/53, 55

[56] References Cited

U.S. PATENT DOCUMENTS

| | | | |
|---|---|---|---|
| 3,770,668 | 11/1973 | Corbett et al. | 260/2.5 E |
| 3,960,792 | 6/1976 | Nakamura | 260/2.5 E |
| 4,412,675 | 11/1982 | Kawakubo | 521/99 |
| 4,489,913 | 12/1984 | Gurgiolo et al. | 521/53 |
| 4,552,903 | 11/1985 | Nafziger et al. | 521/137 |
| 4,574,137 | 3/1986 | Serratelli et al. | 524/724 |
| 4,581,418 | 4/1986 | Serratelli et al. | 525/404 |
| 4,596,665 | 6/1986 | Gonzalez et al. | 252/182 |
| 4,698,369 | 10/1987 | Bell | 521/99 |

*Primary Examiner*—James J. Bell
*Attorney, Agent, or Firm*—John Lezdey; Joe R. Prieto

[57] ABSTRACT

A flame retardant polymeric foam having a flame retarding amount of heat set carbonaceous fibers derived from stabilized acrylic fibers or pitch based fibers, said fibers having an LOI value greater than 40.

17 Claims, No Drawings

FLAME RETARDANT FOAMS

FIELD OF THE INVENTION

This invention relates to a method for the production of flame-retardant polymeric foams and to novel foams obtained thereby. More particularly, the invention provides a means for preparing polyolefin resin, polystyrene, latex, urea, isocyanurate and polyurethane foam structures or the like so as to be flame-retardant along its exterior surface or its entire structure.

BACKGROUND OF THE INVENTION

The physical and mechanical properties of foams make them useful for a wide variety of applications, including upholstery and bedding. However, many foams, for example polyurethane, are inherently flammable and lead to melting and spread of burning debris. In the case of many "conventional" foams such characteristics lead to the sustaining of combustion by progressive smoldering even after the actual flames have extinguished.

It is considered that cellular materials manufactured from flammable polymers are more flammable than the solid materials because the insulating effect of their cellular nature allows a rapid build-up of heat at the heating surface with a consequence high rate of pyrolysis. In solid materials this heat build-up is at a lower rate because of the higher conductivity of the solid material. Although rigid foams have similar thermal conductivity behavior to flexible foams, the high cross-linked nature of their chemical structure makes them less flammable as polymers and also inherently more inclined to form a protective char rather than to form the flaming molten polymer droplets which occur with flexible foams. While both solid and rigid cellular materials burn less easily than flexible foams and are easier to extinguish, they tend to smolder and emit toxic fumes.

The use of polyurethane foams in airplanes is a particular concern. Fires in airplanes are difficult to extinguish when they start since adequate firefighting equipment is not readily available because of weight and size limitations in storage on the aircraft and the inability to maneuver around the passengers. It is therefore desirable to provide a polyurethane foam for use as seat cushions which is fire retardant, does not smolder and is self-extinguishing.

Various methods are known to reduce the flammability of polymer foams. Commonly, additives such as aluminum trihydride or phosphous-containing compounds are incorporated into the foam for this purpose. Alternatively, halogenated polyols, especially brominated polyols such as dibromoneopentyl glycol, are used to increase the flame resistance in the foam. None of these additives have proved entirely satisfactory.

It is known that the incorporation of trimerized polyisocyanates (i.e. isocyanurates) into a foam improves its burn characteristics. For example, trimerized toluenediisocyanate has been used to prepare flexible foams. Although these foams do exhibit good foam characteristics, they also have poor physical properties, particularly poor compression sets and partial cell collapse. In addition, trimerized toluene diisocyanate tends to precipitate from the isocyanate solution in which its is dissolved, causing storage problems and a lack of uniformity in foams prepared therewith.

Each of U.S. Pat. Nos. 4,554,293; 4,528,300 and 4,640,933 to Park, which are herein incorporated by reference disclose polyolefin resin foams which can be used in the present invention.

U.S. Pat. No. 4,699,931 to Fuzesi, et al which is herein incorporated by reference, discloses polyol-free isocyanurate foams which can be used in the present invention.

U.S. Pat. Nos. 4,489,913; 4,552,903; 4,574,137; 4,581,418 and 4,596,665, which are all herein incorporated by reference, disclose the different types of polyurethane foams which may be utilized in the invention and whose flame retarding characteristics can be improved by the method hereinafter described.

U.S. Pat. Nos. 3,770,668 and 3,960,792 which are herein incorporated by reference, disclose typical polystyrene foams which can be utilized in the present invention.

U.S. Pat. No. 4,699,943 to Bertrand, which is herein incorporated by reference, discloses self-extinguishing polystyrene compositions with improved thermal properties. The polystyrene foams are blended with a fire retarding agent consisting of tribromopentaerythritol. There are also disclosed polystyrene compositions whose self-extinguishing characteristics can be further improved by the present invention.

European Patent Application No. 0199567 of McCullough, et al, which corresponds to U.S. patent application Ser. No. 856,305, and is herein incorporated by reference, discloses non-linear carbonaceous fibers which are used to provide the improvements in accordance with the present invention.

The carbonaceous fibers of the invention according to the test method of ASTM D 2863-77 have a LOI value greater than 40. The test mehtod is also known as "oxygen index" or "limited oxygen index" (LOI). With this procedure the concentration of oxygen in $O_2/N_2$ mixtures is determined at which a vertically mounted specimen is ignited at its upper end just continues to burn. The size of the specimen is $0.65 \times 0.3$ cm with a length from 7 to 15 cm. The LOI value is calculated according to the equation:

$$LOI = \frac{[O_2]}{[O_2 + N_2]} \times 100$$

The term "stabilized" herein applies to fibers or tows which have been oxidized at a specific temperature, typically less than about 250° C. for PAN fibers, provided it is understood that in some instances the filament and/or fibers are oxidized by chemical oxidants at lower temperatures.

The term "Reversible Deflection" as used herein applies to a helical or sinusoidal compression spring. Particular reference is made to the publication "Mechanical Design - Theory and Practice", MacMillan Publ. Co., 1975, pp 719 to 748; particularly Section 14-2, pages 721-24.

SUMMARY OF THE INVENTION

In accordance with the present invention there is provided a flame retardant polymeric foam comprising at least about 0.5% of linear and/or non-linear carbonaceous fibers derived from heat set stabilized acrylic fibers or a pitch based fibers. Preferably, the foam is a polystyrene, polyolefin resin, urea, latex, polyurethane or isocyanurate foam. Also, epoxy foam can be used as a binder with the carbonaceous fibers. Advantageously, the carbonaceous fibers of the structures comprise nonflammable non-linear carbonaceous filaments having a reversible deflection ratio of greater than 1.2:1, preferably greater than 2.0:1, and an aspect ratio (l/d) greater than 10:1. Both linear and non-linear carbonaceous fibers essentially have a LOI value greater than 40 and in combination with the foam provide a synergistic effect with respect to the fire retarding and self-extinguishing characteristics of the foam.

It is understood that when the lower amounts of the carbonaceous fibers are being utilized, that is 0.5%, the carbonaceous fiber is intended to be primarily on the surface of the foam structure. The carbonaceous fibers and foam act in combination to retard flame propagation and to extinguish any smoldering on the surface. To provide the foam structure throughout with similar fire retarding and self-extinguishing characteristics, the amount of carbonaceous fibers should be increased and the fibers distributed throughout the foam. When only linear carbonaceous fibers are utilized, it is preferably to utilize at least 10% of the fiber.

It has been surprisingly discovered that when carbonaceous fibers, especially non-linear fibers, are added to the reaction mixture of a foam forming reaction, a substantial portion of the carbonaceous fibers will bcome distributed on the exterior surface of the formed structure when the reaction mixture is not stirred. Even more surprising is the fact that the distribution is substantially uniform on the outer surface. Amounts of up to about 10% by weight of fiber have been found to be sufficient to obtain a dependable distribution of carbonaceous fibers forming an effective barrier portion along the foam's exterior surface.

The amount of carbonaceous fibers required will depend upon the degree of flame retardance desired for the foam but usually the amount of carbonaceous fibers will not exceed about 30% by weight so as to maintain a substantial portion of the foam's original characteristics.

The carbonaceous fibers may comprise the sole flame-retardant additive in the foam forming reaction. Alternatively, other flame-retardant additives, known per se, may be used in addition to the carbonaceous fibers, for example, halogen and/or phosphorous containing compounds, antimony oxides, boron-containing compounds, and the like.

The object of the invention is to provide a flame-retardant polymeric foam from a foam forming reaction mixture which also contains carbonaceous fibers.

It is another object of the invention to provide a flexible flame-retardant polyurethane foam comprising the reaction product of a polymeric polyol and an organic polyisocyanate characterized in that the foam-forming reaction mixture contains carbonaceous fibers.

It is yet still another object of the invention to provide a flame-retardant polystyrene foam containing carbonaceous fibers.

It is still a further object of the invention to prepare a self-extinguishing fire retardant urethane-free isocyanurate foam.

It is yet another object of the invention to provide a method for preparing a flame-retardant self-extinguishing polymeric foam.

The carbonaceous material which may be utilized in the invention may be derived from stabilized acrylic fibers which are classified into three groups depending upon the particular use and the environment that the structures in which they are incorporated are placed.

In a first group, the non-flammable carbonaceous fibers are non-electrically conductive.

The term non-electrically conductive as utilized in the present application relates to a resistance of greater than $10^7$ ohms per inch on a 6k tow formed from carbonaceous fibers having a diameter of 7–20 microns.

When the precursor fiber is a heat set stabilized acrylic fiber, it has been found that a nitrogen percentage of 18.8 or more results in an electrically non-conductive fiber.

In a second group, the non-flammable carbonaceous fibers are classified as being anti-static and having low electrically conductive. These fibers have a carbon content of less than 85%. The percentage nitrogen content of such fibers is generally 16 to about 18.8%. In some fibers derived from acrylic terpolymers the nitrogen content may be higher. Low conductivity means that a 6k tow with the fibers has a resistance of about $10^7$–$10^4$ ohms per inch. Such fibers can be utilized to dissipate static built-up in the foams.

The third groups contains the fibers having a carbon content of at least 85% and a nitrogen content of less than about 16%. These fibers as a result of their high carbon content have good electrical conductivity (a resistance of less than $10^4$ ohms per inch).

The precursor stabilized acrylic filaments which are advantageously utilized in preparing the fibers of the structures are selected from the group consisting of acrylonitrile homopolymers, acrylonitrile copolymers and acrylonitrile terpolymers.

The acrylic copolymers and terpolymers preferably contain at least about 85 mole percent of acrylic units, preferably acrylonitrile units, and up to 15 mole percent of one or more monovinyl units copolymerized with styrene, methylacrylate, methyl methacrylate, vinyl chloride, vinylidene chloride, vinyl pyridine, and the like.

It is to be further understood that carbonaceous precursor starting materials may have imparted to them an electrically conductive property on the order of that of metallic conductors by heating a fluff or a batting-like shaped material of the fibers to above about 1000° C. The electroconductive property may be obtained from selected starting materials such as pitch (petroleum or coal tar), polyacetylene, acrylonitrile based materials, i.e., polyacrylonitrile (PANOX or GRAFIL-01), polyphenylene, and the like.

Preferred precursor materials are prepared by melt spinning or wet spinning the precursor materials in a known manner to yield a monofilament or multi-filament fiber tow and the fibers or filaments yarn, tow, woven cloth or fabric or knitted cloth by any of a number of commercially available techniques, heating the resulting material, preferably to above about 550° C. and thereafter deknitting and opening to produce a fluff which may be laid up in batting-like form.

DESCRIPTION OF THE PREFERRED EMBODIMENTS

The invention comprises flame-retardant polymeric foams having at least about 0.5% by weight of non-flammable carbonaceous fibers having an LOI value greater than 40. The carbonaceous fibers when found only on the exterior surface of the foam are preferably non-linear, for example sinusoidal, coil-like, or a more complicated configuration. Advantageously, amounts up to about 10% of the non-linear fibers are utilized to produce a foam structure having the fibers primarily on the surface. In accordance with one embodiment of the invention the reaction mixture for producing the foam is reacted without stirring the carbonaceous fibers. When the fibers possess a non-linear configuration the fibers move to the outside surface during the reaction.

Obviously, it is possible to produce a similar structure by reacting the foam forming ingredients in a mold with the fibers being placed in the mold during foam formation. In such a case, linear or non-linear fibers can be utilized.

In another embodiment of the invention, a foam structure is prepared having an effective amount of carbonaceous fibers distributed through the structure to provide flame retarding and fire extinguishing properties throughout. In such a case, the foam is prepared by admixing the fibers and the reaction mixture while initiating the foam forming reaction. The carbonaceous fibers may be present in an amount up to about 30% by weight without affecting to any material extent the original foam characteristics.

PREPARATION OF FOAM

The foams which may be utilized in the invention may be formulated so as to be flexible, semi-rigid or rigid in nature. The foams of the invention can take the form of pellets, coatings, pads, seat pads, cases, structural materials and the like.

The polyurethane foams employed in the present invention are preferably prepared from a polyol reactant, which is mixed with an aqueous polyisocyanurate reactant. The foams thus generated are characterized by a crosslinked molecular network.

The polyols used in the preparation of the polyurethane product to be foamed in accordance with the present invention preferably have an average molecular weight of from about 200 to about 20,000 more preferably between about 600 and about 6,000 with a hydroxyl functionality of 2 or greater, preferably from about 2 to about 8.

The polyol is reacted with a polyisocyanate in a convention manner together with the carbonaceous fibers of the invention. The reaction can be carried out in an inert atmosphere, such as under a nitrogen blanket, at atmospheric pressure and at a temperature in the range of from about 0° C. to about 120° C. for a period of time ranging up to about 20 hours, depending upon the temperature and the degree to which the reaction mixture is agitated. The reaction can also be carried out under ambient conditions.

The reaction is effected using stoichiometric amounts of reactants. It is desirable, however, in some cases to use an excess of polyisocyanate in order to insure complete reaction of the polyol. The ratio of isocyanate groups to hydroxyl groups is generally between about 1 to about 4 isocyanate groups per hydroxyl group.

The polyisocyanates employed in the reaction may include a polyaryl polymethylene polyisocyanate as defined in U.S. Pat. No. 2,683,730, for example, benzene 1,3,5-triisocyanate; chlorophenyl diisocyanate; diphenyl-2,4,4'-triisocyanate; diphenylmethane-4,4' diisocyanate; 3,3'-dimethoxy-4,4' biphenylene-diisocyanate, and the like.

Readily available aromatic diisocyanates, aliphatic and cycloaliphatic diisocyanates and polyisocyanates or mixtures thereof, having a high degree of activity, are suitable for use in the reaction.

Polystyrene foams used in the invention may be prepared by conventional methods.

Presently known techniques of preparing expanded polystyrene include the extrusion of a thermoplastic resinous gel in admixture with a volatile raising or blowing agent into a region of lower pressure where the volatile raising agent vaporizes and forms a plurality of gas cells within the extruded gel. The extruded foamed gel is subsequently cooled to form a self-supporting cellular foamed body. A wide variety of foaming or raising agents are known. These foaming or raising agents primarily fall into the class of aliphatic hydrocarbons such as butane, hexane, heptane, pentanes and the like, as well as gases which are soluble in a polymer under pressure such as carbon dioxide. Beneficially, certain fluorinated hydrocarbons are used such as trichlorofluoromethane, trifluoromethane and the like, as well as such chlorohydrocarbons as methyl chloride. Many of these raising agents are found to be satisfactory with various polymeric materials.

The following examples are illustrative of the invention, but are not to be construed as to limiting the scope thereof in any manner. The percentages disclosed relate to percentage by weight.

EXAMPLE 1

A flexible polyurethane foam was prepared by mixing in a quart (0.95 l) size paper cup 100 parts by weight (pbw) of a polyether triol having an average molecular weight of about 3000 commercially available from The Dow Chemical Company as Voranol 3137. 4.3 pbw water, 1.2 parts of L-540 a silicone surfactant commercially available from Union Carbide Corp., and Dabco 33 LV a mixture of 33% by weight of triethylenediamine in dipropylene glycol commercially available from Air Products Co. Then a separate mixture of 1.715 parts of stannous octoate catalyst and 45.2 ml of an 80/20 mixture of 2,4-/2,6-toluenediisocyanate are stirred with the polyol-containing mixture in a one-half gallon (1.89 l) cardboard cup 1 part of sinusoidal carbonaceous fibers. Stirring was stopped when the reaction started. The resultant mixture foamed and filled the cup to give a flexible foam with carbonaceous fibers covering the outside surface.

EXAMPLE 2

The procedure of Example 1 was followed except that 10 parts of linear carbonaceous fibers were utilized in lieu of the sinusoidal fibers. Also, the reaction mixture was continually mixed when the reaction started.

The resultant foam had the carbonaceous fibers distributed throughout from 0.2 to 0.4 millimeter. Such foams provide excellent insulating value and relatively low density stable products.

In the following examples, a plurality of foams are prepared under varying conditions, each employing the hereinbefore described sampling procedure. In each case, polymer is heat plastified in an extruder substantially in the manner of U.S. Pat. No. 2,669,751 and a volatile fluid blowing agent injected into the heat plastified polymer stream. From the extruder the heat plastified gel is passed into a mixer, the mixer being a rotary mixer wherein a studded rotor is enclosed within a housing which has a studded internal surface which intermeshes with the studs on the rotor. The heat plastified gel from the extruder is fed into the end of the mixer and discharged from the remaining end, the flow being in a generally axial direction. From the mixer, the gel passes through coolers such as are described in U.S.

Pat. No. 2,669,751 and from the coolers to a die which extrudes a generally rectangular board. After extrusion a foam of an acceptable, density, cell size, compressive strength, water vapor permeability and thermal conductivity is obtained.

EXAMPLE 3

Polystyrene having a viscosity of 14 centipoises (measured as a 10 percent solution in toluene) is fed to an extruder at the rate of 541 parts by weight per hour together with a mixture of coil-like and sinusoidal carbonaceous fibers having a nitrogen content about 18.1% so as to amount to 20% of the resulting foam. The blowing agent consists of a 1:1 by weight mixture of methyl chloride and dichlorodifluoromethane which is injected into the heat plastified polymer prior to its entry to the mixer. A total feed of $20.3 \times 10^{-4}$ moles of blowing agent per gram of polystyrene is employed. 0.06 part of indigo per 100 parts of polystyrene is added as a nucleator. A stable rectangular board is extruded at a temperature of 121.5° C. having a cross-sectional dimensions of 2.25×24 inches. The fibers were distributed fairly uniformly throughout the foam. The resulting form possessed anti-static characteristics.

EXAMPLE 4

Two flammability tests were run on a foam blends with carbonaceous fibers. Test A was the 45° Flammability Test (AATCC Test Method 33-1962—Flammability of clothing Textiles (which is duplicated by ASTM D1230 and ASA L14.69 and is the same as that described in Title 16 Commercial Practices part 1610 - Code of Federal Regulations). This test consists of impinging a ⅜" flame (butane) onto a 2"×6" sample held at a 45° angle for one second. The samples of the invention failed to ignite even when the flame impingement was greater than 90 seconds.

The second test, Test B, was the 90° angle test used for children's sleepwear testing [see U.S. Dept. of Commerce standard DOC FF 3071 (as amended) and FF5-74]. The method consists of exposing a 2"×10" specimen suspended in a vertical position to a Bunsen burner (propane or methane gas) such that ¾ inches of the lower edge of the specimen is in the flame for 3–12 seconds. The specimens of the invention failed to ignite even after ten minutes in the flame. This test is considered the most severe test method and is primarily designed to test for nonflammable or flame retardant fibers. The results are shown in the following table:

forth in 14 CFR 25.853(b) which is herewith incorporated by reference. The test was performed as follows:

A minimum of three 1"×6"×12" (2.54 cm×15.24 cm×30.48 cm) foam-carbonaceous fiber specimens containing 30% by weight of carbonaceous fibers were conditioned by maintaining the specimens in a conditioning room maintained at 70° C.±5% relative humidity for 24 hours preceding the test. The foam was polyurethane.

Each specimen was supported vertically and exposed to a Bunsen burner with a nominal I.D. tube of 1½ inches (3.8cm) in height. The minimum flame temperature measured by a calibrated thermocouple pyrometer in the center of the flame was 1550° F. The lower edge of the specimen was ¾ inch (1.91 cm) above the top edge of the burner. The fame was applied to the cluster line of the lower edge of the specimens for 12 seconds and then removed.

Pursuant to the test, the material of the invention was considered self-extinguishing. The average burn length did not exceed 8 inches (20.32 cm), the average after flame did not exceed 15 seconds and there were no flaming drippings.

The same results can be achieved with urea, polystyrene, polyolefin, isocyanurate, latex or epoxy foam structures.

EXAMPLE 6

Following the procedure of U.S. Pat. No. 4,640,933, a polyolefin foam composition is prepared having flame retarding characteristics by admixing in the reaction mixture, prior to expansion, 20% by weight of sinusoidal carbonaceous fibers having a carbon content of about 85%.

What is claimed is:

1. A flame retardant polymeric foam, said foam having a flame retarding effective amount of heat set carbonaceous polymeric fibers
    incorporated therein and/or provided on at least one surface of the foam, said fibers having an LOI value greater than 40
    a reversible deflection ratio of greater than 1.2:1 and an aspect ratio greater than 10:1.

2. The foam of claim 1, wherein said carbonaceous fibers comprise a sinusoidal-like configuration.

3. The foam of claim 1, wherien said carbonaceous fibers comprise a coil-like configuration.

4. The foam of claim 1, wherein said carbonaceous fibers have a carbon content of less than 85%.

| Sample | Test | % Fiber | Fiber Heat Treatment Temp. | % Foam | Foam Type | Batting Thickness |
|---|---|---|---|---|---|---|
| 1 | A | 70 | 550 | 30 | cured foam acrylic latex | ¼" |
| 2* | — | 20 | 650 | 80 | cured foam acrylic latex | ¼" |
| 3 | B | 50 | 650 | 50 | DER cured epoxy | ⅛" |

*Sample 2 was tested by impinging an air/acetylene flame (flame temp. = 2460° C.) against the face of the sample for 30 sec. The specimen failed to ignite or burn and the surface face side opposite the impingment flame tip remained cool enough to touch with an unprotected finger.

All of the above specimens passed the respective test, that is, they all failed to ignite or burn under the test conditions used.

EXAMPLE 5

The non-flammability of the foams of the invention has been determined following the test procedure set 5. The foam of claim 1, wherein said carbonaceous fibers have a carbon content of at least 85%.

6. The foam of claim 1, wherein said carbonaceous fibers are derived from acrylic fibers.

7. The foam of claim 6, wherein said carbonaceous fibers are derived from stabilized polyacrylonitrile fibers.

8. The foam of claim 1, wherein said carbonaceous fibers have a nitrogen content of from about 16 to 18.8%.

9. The foam of claim 1, wherein said carbonaceous fibers is non-linear and comprises at least 17% by weight of said foam.

10. The foam of claim 1, wherein said foam is a polystyrene foam.

11. The foam of claim 1, wherein said foam is a polyurethane foam.

12. The foam of claim 1, wherein said carbonaceous fibers are derived from pitch based fibers.

13. The foam of claim 1, wherein said carbonaceous fibers are non-linear and comprise at least 0.5% by weight of said foam.

14. The foam of claim 13, wherein said carbonaceous fibers are distributed substantially about the outer surface of said foam.

15. The foam of claim 1, wherein said carbonaceous fibers are distributed within said foam.

16. The foam of claim 15 wherein said carbonaceous comprise at least 10% by weight of said foam.

17. The foam of claim 1, wherein said polymeric foam comprises a foamed resin selected from the group consisting polyurethane, urea, latex, polyolefin, polystyrene and isocyanurate.

* * * * *